United States Patent
Cheong

(10) Patent No.: US 6,478,366 B1
(45) Date of Patent: Nov. 12, 2002

(54) FRONT PILLAR STRUCTURE OF VEHICLE

(75) Inventor: Jae Hyuk Cheong, Ulsan-shi (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 09/983,335

(22) Filed: Oct. 24, 2001

(30) Foreign Application Priority Data

May 11, 2001 (KR) ........................................ 2001-25798

(51) Int. Cl.⁷ .................................................. B60J 7/00
(52) U.S. Cl. ............................ 296/203.02; 296/203.03; 296/189; 296/188
(58) Field of Search ....................... 296/203.02, 203.01, 296/203.04, 203.03, 188, 189, 30, 202, 146.6; 280/751

(56) References Cited

U.S. PATENT DOCUMENTS

| | | | |
|---|---|---|---|
| 4,682,812 A | * | 7/1987 | Hurten et al. ............... 296/188 |
| 5,246,263 A | * | 9/1993 | Tanaka et al. .............. 296/189 |
| 5,246,264 A | * | 9/1993 | Yoshii ................... 296/203.03 |
| 5,544,933 A | * | 8/1996 | Shahab et al. .......... 296/203.01 |
| 5,575,500 A | * | 11/1996 | Mimura et al. ............. 296/189 |
| 5,653,495 A | * | 8/1997 | Bovellan et al. ............. 296/188 |
| 5,722,715 A | * | 3/1998 | Patel et al. ................. 296/189 |
| 5,725,271 A | * | 3/1998 | Patel et al. ................. 296/189 |
| 5,741,044 A | * | 4/1998 | Kawai et al. .......... 296/203.04 |
| 6,073,992 A | * | 6/2000 | Yamauchi et al. ..... 296/203.01 |
| 6,173,990 B1 | * | 1/2001 | Nakajima et al. ........... 280/751 |
| 6,267,438 B1 | * | 7/2001 | Jonsson ................. 296/203.03 |
| 6,334,626 B2 | * | 1/2002 | Nakajima et al. ........... 296/97.1 |
| 6,340,200 B1 | * | 1/2002 | Enomoto et al. ...... 296/203.02 |
| 6,340,203 B2 | * | 1/2002 | Enomoto et al. ...... 296/203.02 |
| 6,364,401 B1 | * | 4/2002 | Kim ........................... 296/188 |
| 6,394,536 B2 | * | 5/2002 | Takahara .................... 296/189 |
| 2001/0000290 A1 | * | 4/2001 | Nakajima et al. ......... 280/730.2 |
| 2001/0040392 A1 | * | 11/2001 | Yoshida ................. 296/203.02 |
| 2002/0063444 A1 | * | 5/2002 | Kim ....................... 296/203.02 |

FOREIGN PATENT DOCUMENTS

| | | | |
|---|---|---|---|
| JP | 2000 225966 | * | 8/2000 |
| JP | 2001 63621 | * | 3/2001 |
| JP | 2001 301654 | * | 10/2001 |
| JP | 2002 29455 | * | 1/2002 |

* cited by examiner

Primary Examiner—Kiran Patel
(74) Attorney, Agent, or Firm—Birch, Stewart, Kolasch & Birch, LLP

(57) ABSTRACT

A front pillar structure of vehicle, wherein a front pillar inner panel and a front pillar outer panel each joined and coupled at both ends thereof; a front door checker bracket having one lateral end thereof coupled at plane thereof with an inner surface of the front pillar outer panel and having the other lateral end thereof extended and bent along an inner surface of the front pillar inner panel; and a door checker reinforcing bracket inserted in the shape of layers and coupled at plane thereof between an inner surface of the front pillar inner panel and the front door checker bracket, whereby rigidity of the front pillar is reinforced by shapes and coupled structure of the front door checker bracket and the door checker reinforcing bracket such that, even when a head-on collision and offset collision occur while an automobile is running, both joined parts between the front pillar inner panel and the front pillar outer panel are prevented from easy separation therebetween, whereby the entire body is also avoided from being excessively disintegrated, thereby protecting the safety of passengers to a maximum, and improving the quality of the automobile.

4 Claims, 3 Drawing Sheets

FRONT PILLAR STRUCTURE OF VEHICLE

BACKGROUND OF THE INVENTION

1. Field of the Invention

The present invention relates to a front pillar structure of vehicle, and more particularly to a front pillar structure of vehicle adapted to reinforce front pillar to minimize disintegration of vehicle body when there occurs a head-on collision or offset collision, thereby protecting passengers safety to a maximum.

2. Description of the Prior Art

Generally, front pillars 10 are pillars situated at both sides of window glass for supporting roof panel and are called "A" pillars or "A" posts, as illustrated in FIG. 1.

The front pillar of the known art includes, as illustrated in FIG. 2, a front pillar inner panel 11 bent in a predetermined shape and positioned toward interior of the vehicle, a front pillar outer panel 12 detached from the front pillar inner panel 11 at a predetermined interval to be positioned toward exterior side and having both ends thereof abutting on both ends of the front pillar inner panel 11, and a front door checker bracket 13 situated between the front pillar outer panel 12 and the front pillar inner panel 11 and coupled therebetween.

At this time, the front door checker bracket 13 is approximately formed in "L" shape as illustrated in FIGS. 2 and 3 and includes a first coupling unit 13a coupled at plane thereof to an inner plane surface of the front pillar outer panel 12, a second coupling unit 13b inserted in layers between one end of the front pillar inner panel 11 facing the first coupling unit 13a and one end of the front pillar outer panel 12 to be coupled and combined with the front pillar inner panel 11 and the front pillar outer panel 12, and a body unit 13c situated between the front pillar inner panel 11 and the front pillar outer panel 12 to integrally connect the first and second coupling units 13a and 13b.

However, there is a problem in the front pillar structure thus described according to the prior art in that the front door checker bracket 13 is not structured to reinforce rigidity of the front pillar inner panel 11 or front pillar outer panel 12 but only structured to be positioned between the front pillar inner panel 11 and the front pillar outer panel 12, such that, when there occurs a head-on collision or offset collision while a vehicle is running, joined parts A and B between the front pillar inner panel 11 and the front pillar outer panel 12 are easily separated to excessively disintegrate the entire body, thereby failing to effectively protect passengers' safety.

SUMMARY OF THE INVENTION

The present invention is disclosed to solve the aforementioned problems and it is an object of the present invention to provide a front pillar structure of vehicle so adapted as to change the shape of structure to allow a front door checker bracket to coupled in plane thereof with an inner surface of a front pillar inner panel and to install a door checker reinforcing bracket between the front door checker bracket and front pillar inner panel, thereby reinforcing rigidity of overall front pillars, such that, even if there occurs a head-on collision or offset collision, easy separation of coupled part between the front pillar inner panel and the front pillar outer panel can be maximally prevented and excessive disintegration of entire body resulted therefrom can be also prevented, thereby protecting passengers' safety to a maximum.

In accordance with the object of the present invention, there is provided a front pillar structure of vehicle, the structure comprising:

a front pillar inner panel and a front pillar outer panel each joined and coupled at both ends thereof;

a front door checker bracket having one lateral end thereof coupled at plane thereof with an inner surface of the front pillar outer panel and having the other lateral end thereof extended and bent along an inner surface of the front pillar inner panel; and a door checker reinforcing bracket inserted in the shape of layers and coupled at plane thereof between an inner surface of the front pillar inner panel and the front door checker bracket.

BRIEF DESCRIPTION OF THE DRAWINGS

For fuller understanding of the nature and objects of the invention, reference should be made to the following detailed description taken in conjunction with the accompanying drawings in which.

DETAILED DESCRIPTION OF THE INVENTION

Preferred embodiment of the present invention will now be described in detail with reference to the accompanying drawings.

Figure 1:
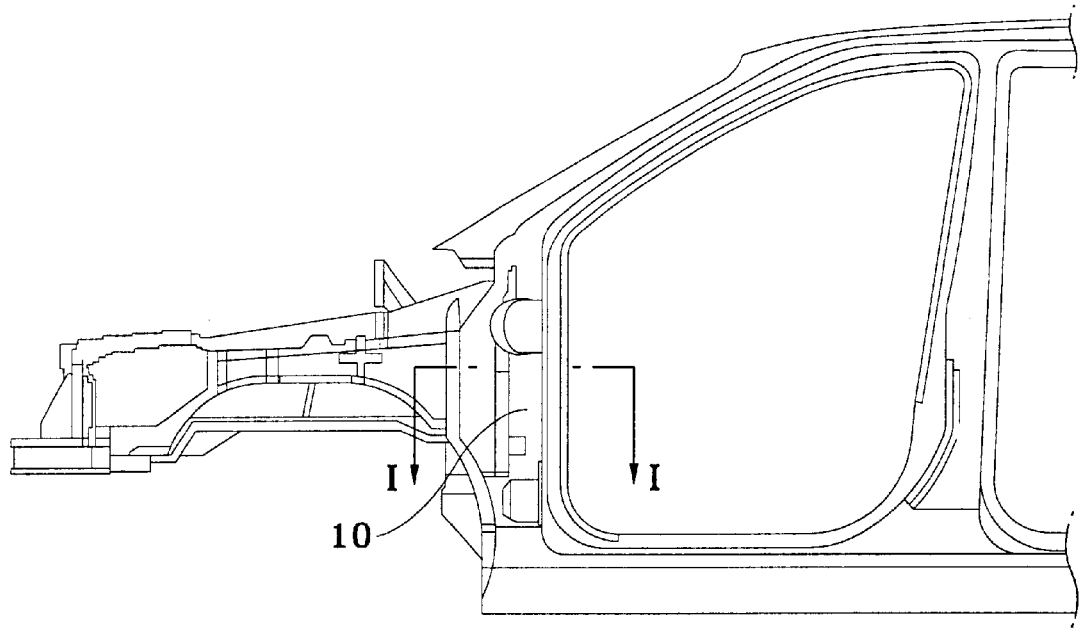
FIG. 1 is a side view of a front pillar according to the prior art.
Figure 2:
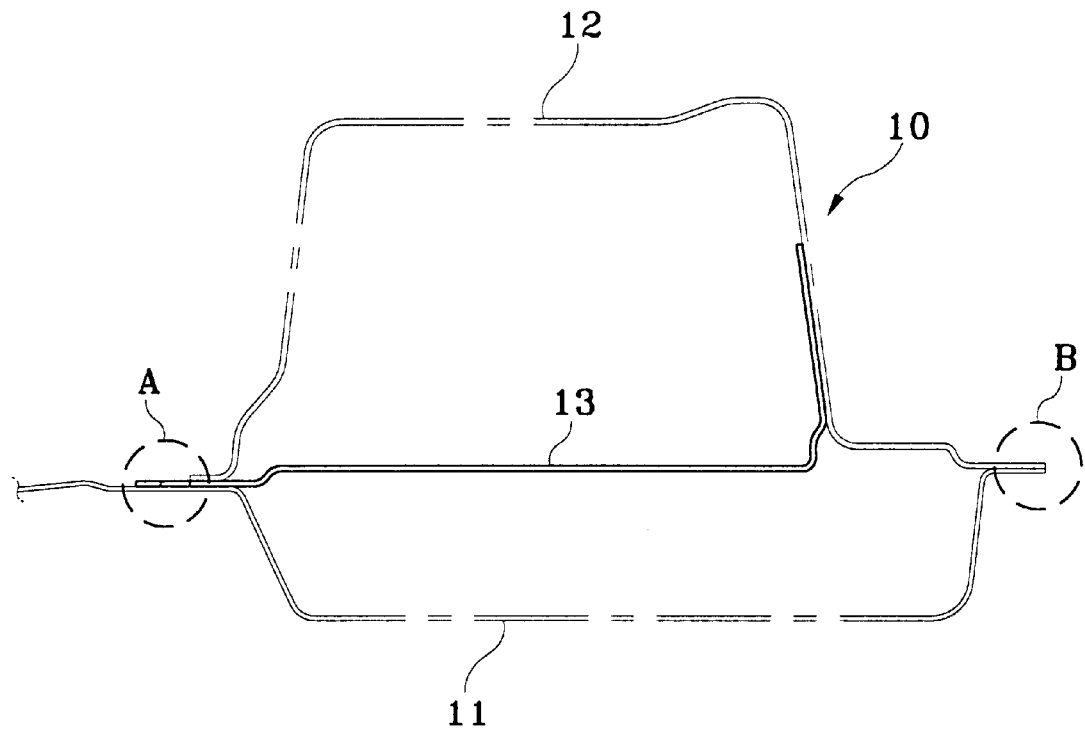
FIG. 2 is a partial sectional view taken along line I—I of FIG. 1.
Figure 3:
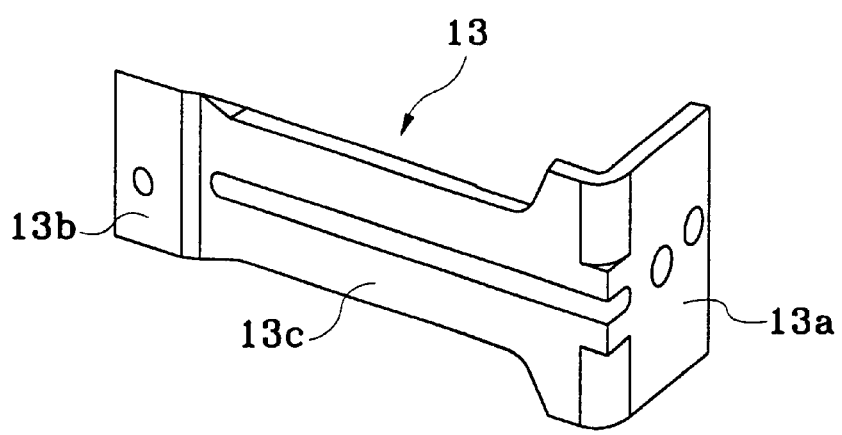
FIG. 3 is a perspective view for illustrating a front door checker bracket according to the prior art.
Figure 4:
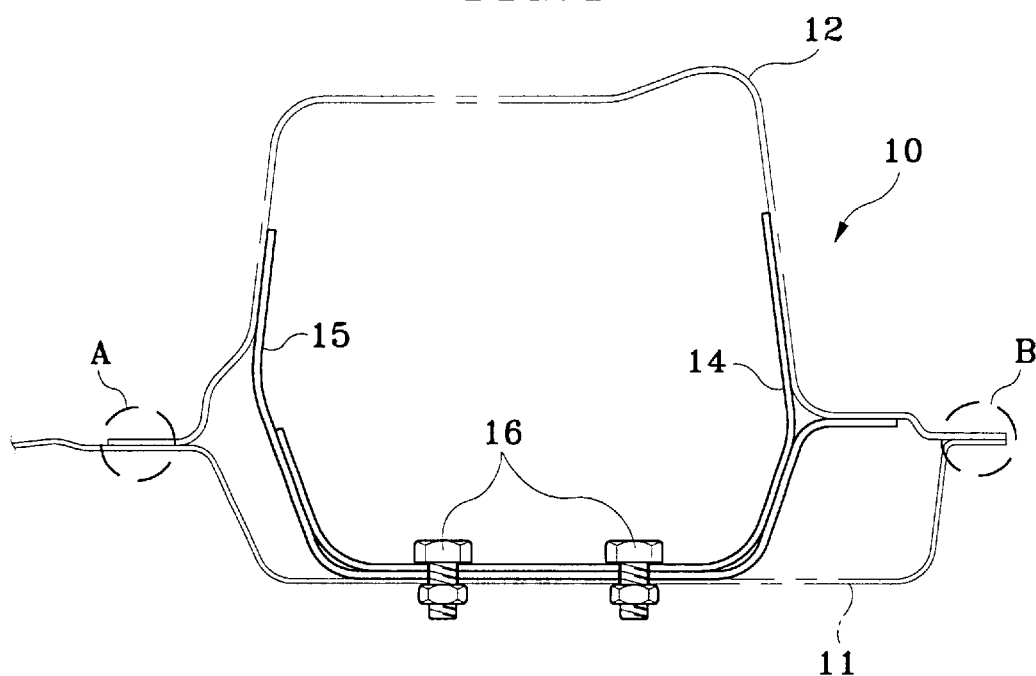
FIG. 4 is a sectional view for illustrating a structure of front pillar according to the present invention.

FIG. 4 is a sectional view for illustrating a structure of a front pillar according to the present invention where like reference numerals and symbols are used for designation of like or equivalent parts or portions as in FIGS. 1, 2 and 3 for simplicity of illustration and explanation.

The structure of front pillar according to the present invention includes a front pillar inner panel 11 bent in a predetermined shape and positioned toward interior of the vehicle, a front pillar outer panel 12 detached from the front pillar inner panel 11 at a predetermined interval to be positioned toward exterior side and having both ends thereof abutting on both ends of the front pillar inner panel 11, a front door checker bracket 14 having one lateral end thereof coupled at plane thereof with an inner surface of the front pillar outer panel 12 and having the other lateral end thereof extended and bent along an inner surface of the front pillar inner panel 11, and a door checker reinforcing bracket 15 inserted in the shape of layers and coupled at plane thereof between an inner surface of the front pillar inner panel 11 and the front door checker bracket 14.

Meanwhile, layered part at the front pillar inner panel 11, front door checker bracket 14 and the door checker reinforcing bracket 15 has a structure where it is joined by a plurality of coupling members 16.

At this time, the coupling members 16 have a structure as illustrated in FIG. 4 where the front door checker bracket 14, the door checker reinforcing bracket 15 and the front pillar inner panel 11 are sequentially penetrated by bolts and nuts threaded thereto, but the structure is not limited thereto.

Furthermore, the door checker reinforcing bracket 15 faces at one end thereof in extension form on end of the front door checker bracket 14 abutted on an inner surface of the front pillar outer panel 12 to couple with an inner surface of the front pillar outer panel 12 while the door checker reinforcing bracket 15 is extensively formed at the other end thereof toward a joined part (B) between the front pillar inner panel 11 and the front pillar outer panel 12 to couple with an inner surface of the front pillar outer panel 12.

Figure 5:
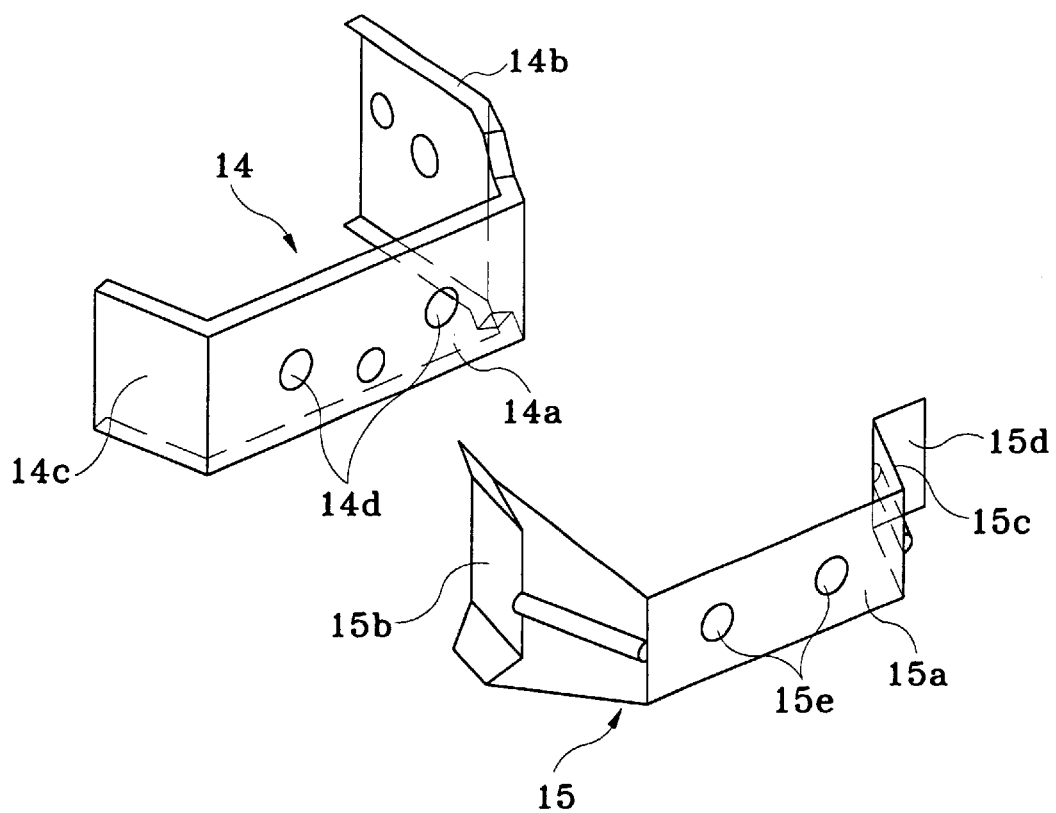
FIG. 5 is a perspective view for illustrating a front door checker bracket and a door checker reinforcing bracket according to the present invention.

In other words, the door checker reinforcing bracket 15 has an approximate "⊂" shape as illustrated in FIGS. 4 and 5, and includes a body unit 15a layered between an inner surface of the front pillar inner panel 11 and the front door checker bracket 14 to abut therebetween and to be coupled by a plurality of coupling members 16, a first coupling unit 15b extensively formed from one end of the body unit 15a to face one end of the front door checker bracket 14 coupled with an inner surface of the front pillar outer panel 12 and to abut on an inner surface of the front pillar outer panel 12, a second coupling unit 15c extensively formed from the other end of the body unit 15a to couple with an outer surface of the front door checker bracket 14 positioned to traverse the front pillar inner panel 11 and the front pillar outer panel 12, and a third coupling unit 15d extensively formed from the second coupling unit 15c toward the joined part (B) between the front pillar inner panel 11 and the front pillar outer panel 12 to couple with an inner surface of the front pillar outer panel 12.

Furthermore, the front door checker bracket 14 is structured at one end thereof to couple with an inner surface of the door checker reinforcing bracket 15.

In other words, the front door checker bracket 14 has an approximate form of "⊂" shape as shown in FIGS. 4 and 5 and includes a body unit 14a layered and coupled to an inner surface of the body unit 15a of the door checker reinforcing bracket 15 and to be coupled by a plurality of coupling members 16, a first coupling unit 14b extensively formed from one end of the body unit 15a to face the first coupling unit 15b of the door checker reinforcing bracket 15 to couple one inner surface of the front pillar outer panel 12, and a second coupling unit 14c extensively formed from the other end of the body unit 15a toward the first coupling unit 15b of the door checker reinforcing bracket 15 to couple an inner surface of the door checker reinforcing bracket 15.

Meanwhile, at the body unit 14a of the front door checker bracket 14 and the body unit 15a of the door check reinforcing bracket 15 there are formed a plurality of predetermined sizes of assembly holes 14d and 15e for screwing the coupling members 16 or to penetrate the coupling member 16.

As a result, when the front door checker bracket 14 is extensively formed along the inner surface of the front pillar inner panel 11 and the door checker reinforcing bracket 15 is coupled with the inner surfaces of the front door checker bracket 14 and the front pillar inner panel 11, and when the front pillar inner panel 11, front door checker bracket 14 and the door checker reinforcing bracket 15 are assembled by the plurality of coupling members 16, rigidity at a central portion of entire front pillar 10 is structurally further strengthened than that of the prior art of FIG. 2 by the coupled structure between the front door checker bracket 14 and the door checker reinforcing bracket 15.

Furthermore, when one end of the door checker reinforcing bracket 15 is extensively formed toward the joined part (A) between the front pillar inner panel 11 and the front pillar outer panel 12 to couple with the inner surface of the front pillar outer panel 12 and when one end of the front door checker bracket 14 is coupled with the inner surface of the door checker reinforcing bracket 15 while the other end of the door checker reinforcing bracket 15 is extensively formed toward the joined part (B) between the front pillar inner panel 11 and the front pillar outer panel 12 to allow being coupled to the outer surface of the front door checker bracket 14 and the inner surface of the front pillar outer panel 12, rigidity at both portions of the entire front pillar 10 is much more reinforced in structure thereof than that of the prior art featured in FIG. 2.

As mentioned above, when the rigidity of the front pillar 10 according to the present invention is reinforced, and even when a head-on collision and offset collision occur while an automobile is running, both joined parts (A, B) between the front pillar inner panel 11 and the front pillar outer panel 12 are prevented from easy separation therebetween, such that the entire body is also avoided from being excessively disintegrated, thereby protecting the safety of passengers to a maximum.

As apparent from the foregoing, there is an advantage in the front pillar structure of vehicle thus described according to the present invention in that the rigidity of the front pillar is reinforced by shapes and coupled structure of the front door checker bracket and the door checker reinforcing bracket such that, even when a head-on collision and offset collision occur while an automobile is running, both joined parts between the front pillar inner panel and the front pillar outer panel are prevented from easy separation therebetween, whereby the entire body is also avoided from being excessively disintegrated, thereby protecting the safety of passengers to a maximum, and improving the quality of the automobile.

What is claimed is:

1. A front pillar structure of vehicle, the structure comprising:
    a front pillar inner panel and a front pillar outer panel each joined and coupled at both ends thereof;
    a front door checker bracket having one lateral end thereof coupled at plane thereof with an inner surface of the front pillar outer panel and having the other lateral end thereof extended and bent along an inner surface of the front pillar inner panel; and
    a door checker reinforcing bracket inserted in the shape of layers and coupled at plane thereof between an inner surface of the front pillar inner panel and the front door checker bracket.

2. The structure as defined in claim 1, wherein the layered part at the front pillar inner panel, front door checker bracket and the door checker reinforcing bracket has a structure where it is joined by a plurality of coupling members.

3. The structure as defined in claim 1, wherein the door checker reinforcing bracket faces at one end thereof in extensive form one end of the front door checker bracket abutted on an inner surface of the front pillar outer panel to couple with an inner surface of the front pillar outer panel while the door checker reinforcing bracket is extensively formed at the other end thereof toward a joined part between the front pillar inner panel and the front pillar outer panel to couple with an inner surface of the front pillar outer panel.

4. The structure as defined in claim 1, wherein the front door checker bracket is structured at one end thereof to couple with an inner surface of the door checker reinforcing bracket.

* * * * *